UNITED STATES PATENT OFFICE.

ROBERT W. J. SMITH, OF HOUSTON, TEXAS.

POWER-TRANSMITTING MECHANISM 1,301,982.

Specification of Letters Patent. Patented Apr. 29, 1919.

Application filed April 6, 1918. Serial No. 227,089.

*To all whom it may concern:*

Be it known that I, ROBERT W. J. SMITH, a citizen of the United States, residing at Houston, in the county of Harris and State of Texas, have invented certain new and useful Improvements in Power-Transmitting Mechanism, of which the following is a specification.

This invention relates to new and useful improvements in a power transmitting mechanism.

The object of the invention resides in the provision of a device of the character described, designed for connecting a driving shaft with one or more driven shafts, whereby the driven shafts are continuously rotated.

A further feature of the invention resides in the provision of a mechanism whereby the relative speed of the driven shafts with respect to the driving shaft may be quickly and easily changed.

With the above and other objects in view, the invention has particular relation to certain novel features of construction, operation and arrangement of parts, an example of which is given in this specification, and illustrated in the accompanying drawings, wherein.

Referring now more particularly to the drawings, wherein like numerals of reference designate similar parts in each of the figures, the numeral 1, refers to a hollow driving shaft provided with three open rectangular frames 2, 3 and 4, each of which is formed integral with the shaft, the long axes of the frames coinciding with the axes of the shaft. Cams 5, 6 and 7, are mounted on these frames, each cam having a slot 8 for receiving the frame and the slots 8, are of greater length than the width of the frame upon which the cam is mounted.

Figure 1:
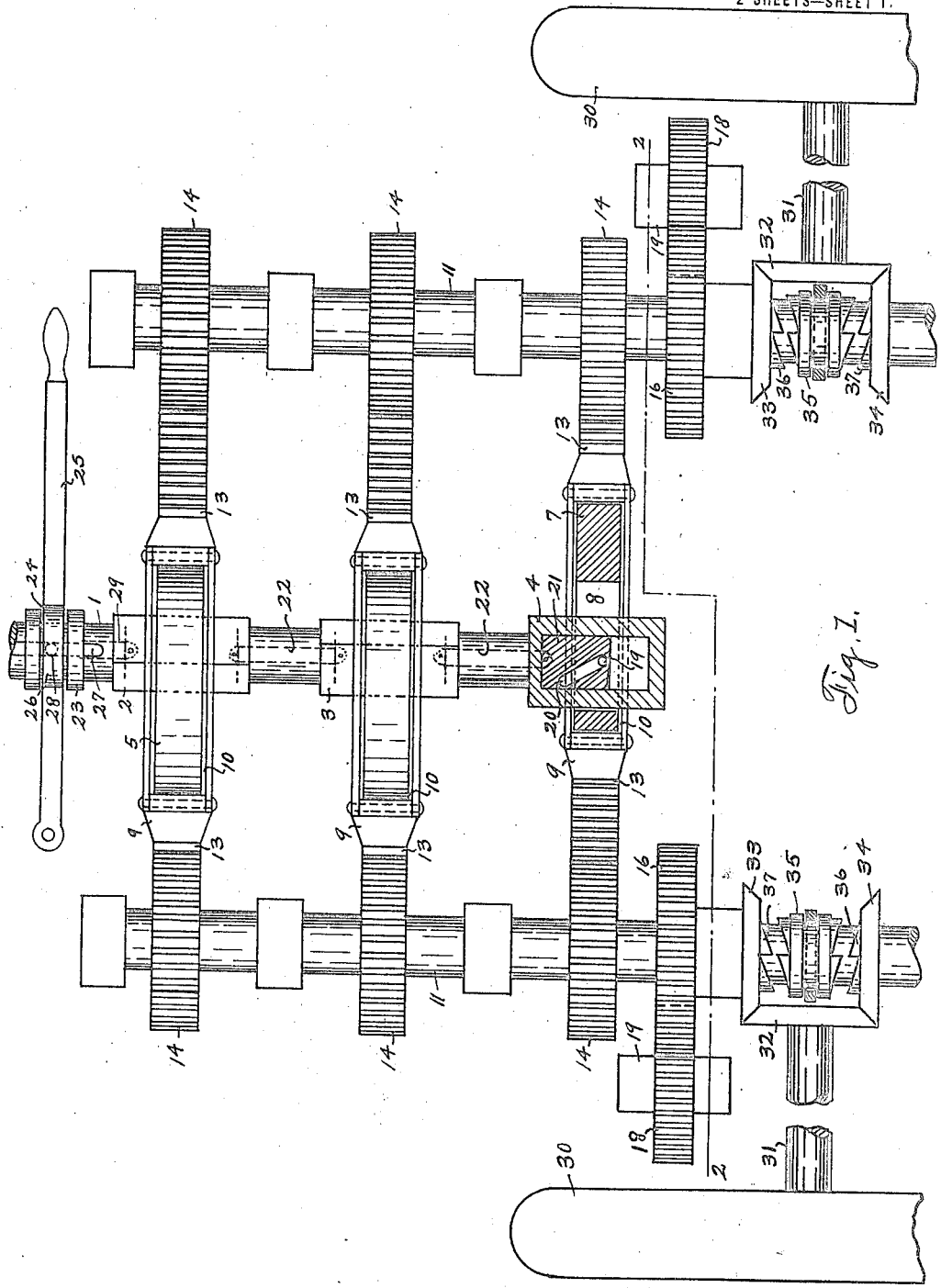
Figure 1, is a plan view of the device, partially in section.

A yoke 9 is engaged by each cam, each yoke having a rectangular opening 10, in which the cam is arranged, and the cam touches opposite ends of the opening, but the yoke is open above and below, allowing the cam free vertical movement, as illustrated in Fig. 1, so that when the cam rotates, the yoke is reciprocated transversely of the shaft. All of the yokes are reciprocated in the same direction, and each has a driving connection with the lateral or driven shafts 11, 11, and 12, 12, which are rotatably mounted in suitable bearings on opposite sides of the shaft 1.

The opposite ends of each yoke are formed into double rack members 13, 13, that is, the opposite sides of said rack members have gear faces, which are in mesh with the corresponding gear wheels 14, 14, and 15, 15, the former being located on the shaft 11, and the latter being located on the shaft 12. These gear wheels are arranged to be clutched with their respective shafts when rotated in one direction, and declutched from the shafts when rotated in the opposite direction, through the well known form of roller clutch, shown in Fig. 2, said clutches being arranged so that when the rack member 13 is reciprocated in either direction, one of said gear wheels will clutch and drive its shaft, and the other will run idle, and vice versa.

Figure 2:
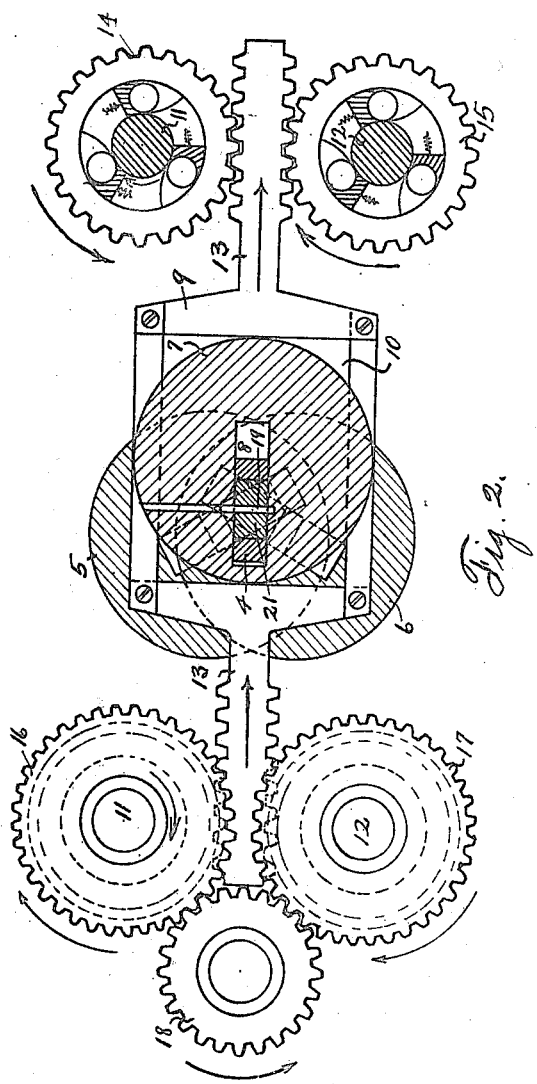
Fig. 2, is a transverse sectional view, taken on the line 2—2 of Fig. 1.

When any particular member 13 is reciprocated in the direction indicated by the arrow in Fig. 2, the gear wheel 15 shown at the right hand of Fig. 2, will be rotated correspondingly and will be clutched with and drive the corresponding shaft 12, while the corresponding gear wheel 14 will run idle on the shaft 11. Fixed upon the shafts 11, 11, and 12, 12, are the respective spur gear wheels 16, 16, and 17, 17, and in mesh with the gear wheels 16 and 17 on each side are the intermediate gear wheels 18, 18, rotatably mounted upon the shafts 19, 19. The rotation imparted to said shaft 12 from the corresponding gear wheel 15, is transmitted through the gear wheel 17, fixed on said shaft 12, and gear wheels 18 and 16, the latter of which is fixed on said shaft 11, causing it to rotate in the direction indicated by the arrows in Fig. 2. When the rack member 13, is actuated in the opposite direction, the direction of rotation of gear wheels 14 will be reversed, and it will be clutched with and continue the rotation of the shaft 11, in the same direction, thus imparting a continuous rotation to the last mentioned shaft without reversing the direction thereof; so that when either rack member is reciprocated in one direction, it is operatively connected with and drives the corresponding shaft 11 through the corresponding gears 15, 17, 18 and 16, and when reciprocated in the other direction, it rotates said shaft 11, directly through the corresponding gear wheel 14.

Each of the cams 5, 6 and 7, is provided with a pin 19', arranged transversely of the slot 8, at the point of eccentricity of the cam, and each pin 19' passes through a slot 20 of the block 21. Each block is slidable in the frame upon which the cam is mounted, longitudinally of the shaft 1, and it will be evident that when the block is moved, the cam will be shifted to increase or decrease its eccentricity.

The shaft 1, is hollow, and the blocks 21 are connected by means of the link 22. The outer end of the shaft 1, has a sleeve 23, slidably mounted thereon, provided with an annular groove 24, and a shift lever 25 is provided, having a collar 26, fitted into the groove 24, permitting the rotation of said sleeve, and provided for the lengthwise adjustment thereof on the shaft 1. This shaft has an oblong slot 27, cut therethrough to receive the pin 28, whose ends are anchored in the sleeve 23, and a link 29, connects said pin with the block of the frame 2. It will be evident that when the lever is shifted, the blocks 21 will be moved simultaneously, longitudinally of the shaft, through the links 29 and 22, and all of the cams will be shifted simultaneously to increase or decrease their eccentricity. Since the travel or speed of the shafts 11, 11, and 12, 12, with respect to the shaft 1, is dependent upon the eccentricity of the cams, the relative speed is varied, and by reason of the fact that each gear 14 and 15 is arranged to run idle when rotated in one direction, and to be clutched with its shaft when rotated in the other direction, one of the rack members is thus permitted to move faster than the others, at times, in any particular direction, the gear wheels connected with said other rack members at said times, being in effect, retarded, running idly on their respective shafts. A plurality of cams spaced at equal angles around the shaft 1, are made use of to insure a uniform rotation of the shafts 11, 11. It is obvious that if there be but one cam, and one yoke, the rotation of the shafts 11, 11, would not be uniform, and would temporarily cease altogether at the time of the reversal of the direction of the movement of the yoke. In fact, the greater the number of cams, and mechanisms connecting them to the shafts 11, the more uniform is the rotation of the shafts, 11.

The device is specially intended for use in automobiles, and two driven shafts 11, 11. are employed for driving corresponding rear wheels 30, 30; in order that each rear wheel may be on its own shaft, thus dispensing with the necessity of the differential gear. It will be noted that either wheel, that is, that either shaft 11, may be rotated forwardly with the cams idle, therefore when going around the corner, the outer wheel can rotate faster than the inner wheel, thereby avoiding the necessity of a differential gear, in the axle.

Each of the rear wheels 30, is fixed to a spindle 31, whose inner end is provided with a miter gear 32, in mesh with the oppositely arranged beveled gears 33 and 34, which are loosely mounted upon the corresponding shaft 11. Between the gears 33 and 34, on each shaft is a clutch member 35, arranged to be simultaneously clutched with the clutch members 36, of the beveled gears 33 and 34, when it is desired to propel the machine forwardly, and it may be simultaneously clutched with the clutch members 37, of the opposing beveled gears 33 and 34, when it is desired to propel the vehicle backwardly. When the clutch members 35, are brought to neutral position as shown in Fig. 1, the shafts 11, will run idle without transmitting power to the rear wheels 30.

While specially designed for use in automobiles, the device may be also used with motor vehicles of any class, and with machine tools such as lathes, and boring drills, and any other devices requiring different speeds.

Inasmuch as the speed of the driven shafts 11, varies with the eccentricity of the cams, it is obvious that the speed of the vehicle or other driven mechanism, is proportional to the eccentricity of the cams, therefore an indefinite number of speeds may be obtained without any sudden transition from one speed to the other thus eliminating the shifting of gears, necessary when changing from one speed to another with the present type of transmission mechanism now in common use.

What I claim is:

1. A device of the character described including a driving shaft, a driven shaft on each side thereof, the driving shaft having a plurality of substantially rectangular guide frames, a block slidable in each frame, longitudinal of the shaft, a cam wheel for each frame, each wheel having a slot for receiving the frame, the slot being of greater length than the width of the frame, a pin arranged transversely of the slot of each cam and passing through the slot of the block in the adjacent frame, a connection between the blocks of said frames through which they are moved simultaneously lengthwise, of the driving shaft, means for moving said blocks, a yoke for each cam, each yoke having a central opening for receiving the cam, the cam engaging opposite sides of the opening of the yoke to reciprocate said yoke back and forth transversely, the opposite sides of each yoke being formed into rack members, and an operative connection between said rack members, and the corresponding driven shaft on each side through which each of said driven shafts is continuously rotated in the same direction by the reciprocation of said rack members.

2. The combination with a driving shaft, having a plurality of guides extending longitudinal of the shaft, of a block movable in each guide longitudinal of the shaft, each block having a slot inclined to the shaft, a cam for each guide, each cam having a slot for the guide of greater length than the width of the guide, a pin carried by each cam and extending through the slot of the corresponding block, means for simultaneously moving the blocks, a driven shaft on each side of the driving shaft, a yoke reciprocated by each cam, the opposite ends of each yoke being formed into a rack member and spur gears operated by said rack members and operatively connected to the driven shafts through which each of said shafts is continuously rotated in one direction through the corresponding rack member.

3. The combination with a driving shaft, of a driven shaft, located on each side thereof, a plurality of cams mounted on the driving shaft, means for varying the eccentricity of said cams, a yoke reciprocated by each cam, and the opposite ends of each cam being formed into rack members, roller clutch members mounted on each driven shaft, and in operative connection with the corresponding rack members, and through which rotation is imparted to the driven shaft in one direction, from the co-acting rack members, successively.

4. The combination with a driving shaft, of a driven shaft, located on each side thereof, a plurality of cams mounted on the driving shaft, means for varying the eccentricity of said cams, a yoke reciprocated by each cam, the opposite ends being formed into rack members, roller clutches mounted on each driven shaft, said clutches being actuated by the corresponding rack members successively, to rotate the corresponding driven shafts when the rack members are moved in one direction, and a train of gears operatively connected with each driven shaft and actuated successively by the corresponding rack members to continue the rotation of the driven shafts, when the rack members are moved in the opposite direction.

5. The combination with a driving shaft, of a driven shaft, a plurality of cams mounted on the driving shaft, means for varying the eccentricity of said cams, a yoke reciprocated by the respective cams, roller clutches mounted on the driven member and actuated by the respective yokes to successively rotate said driven shaft, when the yokes are actuated in one direction, and a train of gears actuated successively by the respective yokes and operatively connected with said driven shaft, to continue the rotation of said shaft when the yokes are actuated in the opposite direction.

In testimony whereof I have signed my name to this specification in the presence of two subscribing witnesses.

ROBERT W. J. SMITH.

Witnesses:
  E. V. HARDWAY,
  IRENE BRUNS.